United States Patent [19]

Taniguchi

[11] Patent Number: 4,851,867
[45] Date of Patent: Jul. 25, 1989

[54] PHOTOGRAPHING NUMBER CHANGE-OVER DEVICE FOR TWO LENS CAMERA

[75] Inventor: Hiroshi Taniguchi, Chiba, Japan

[73] Assignee: Mamiya Camera Co., Ltd., Tokyo, Japan

[21] Appl. No.: 216,481

[22] Filed: Jul. 8, 1988

[30] Foreign Application Priority Data

Jul. 31, 1987 [JP] Japan .................. 62-193110

[51] Int. Cl.$^4$ ................................. G03B 1/60
[52] U.S. Cl. ..................... 354/118; 354/125
[58] Field of Search ............. 354/118, 111, 120, 122, 354/124, 125

[56] References Cited

U.S. PATENT DOCUMENTS

| | | | |
|---|---|---|---|
| 3,443,499 | 5/1969 | Gianino ................. | 354/125 X |
| 4,101,913 | 7/1978 | Gallistel et al. ........... | 354/122 |
| 4,751,537 | 6/1988 | Saita ..................... | 354/118 |

Primary Examiner—L. T. Hix
Assistant Examiner—Brian W. Brown
Attorney, Agent, or Firm—Pollock, Vande Sande & Priddy

[57] ABSTRACT

A photographing number change-over device for a two lens camera having two photographing lenses equipped with shutters, respectively, is capable of photographing two pictures on a film. The photographing number change-over device comprises a driving member moving to two different positions alternately every time shutter charge is effected, a light cut-off plate rotatable about an axis substantially in parallel with optical axes of the photographing lenses, a regulating member engaging the light cut-off plate and detachably engaging the driving member for anchoring the light cut-off plate at either of first and second positions where the light cut-off plate shuts off either of the two photographing lenses and anchoring the light cut-off plate at a third position where the light cut-off plate shuts off neither of the two photographing lenses, and a change-over member for causing the regulating member and driving member to engage and disengage from each other. The photographing number change-over device further comprises a counter device for displaying the number of photographing times, which comprises a counter dial device for advancing and retracting marks one by one to be displayed in a counter window and respectively interlocking with the change-over member and the driving member, and a counter window opening member for concealing and revealing the marks to be displayed in the counter window interlocking with operations of the change-over member.

10 Claims, 12 Drawing Sheets

FIG_1
PRIOR ART
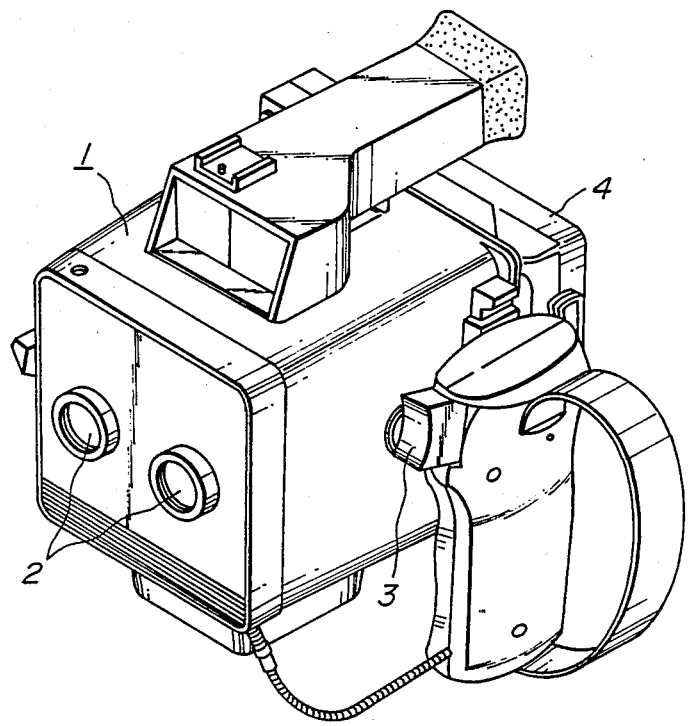
FIG_2
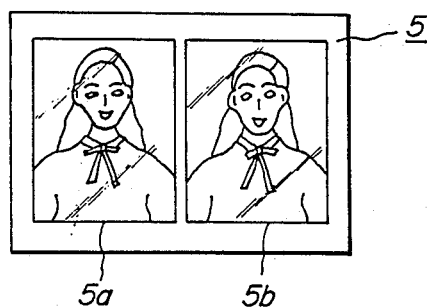

FIG_3
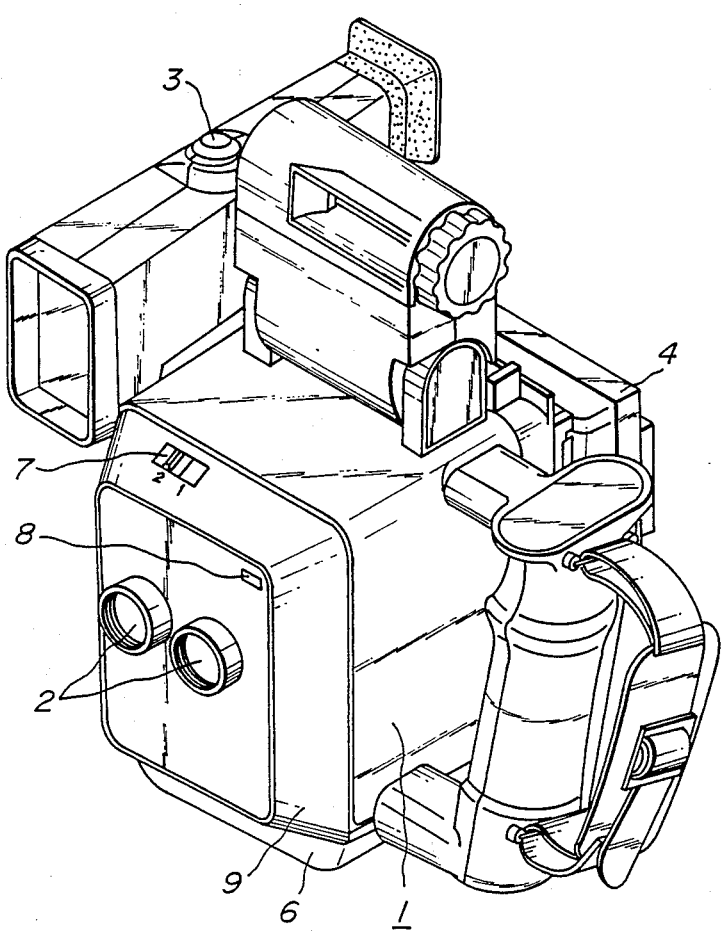

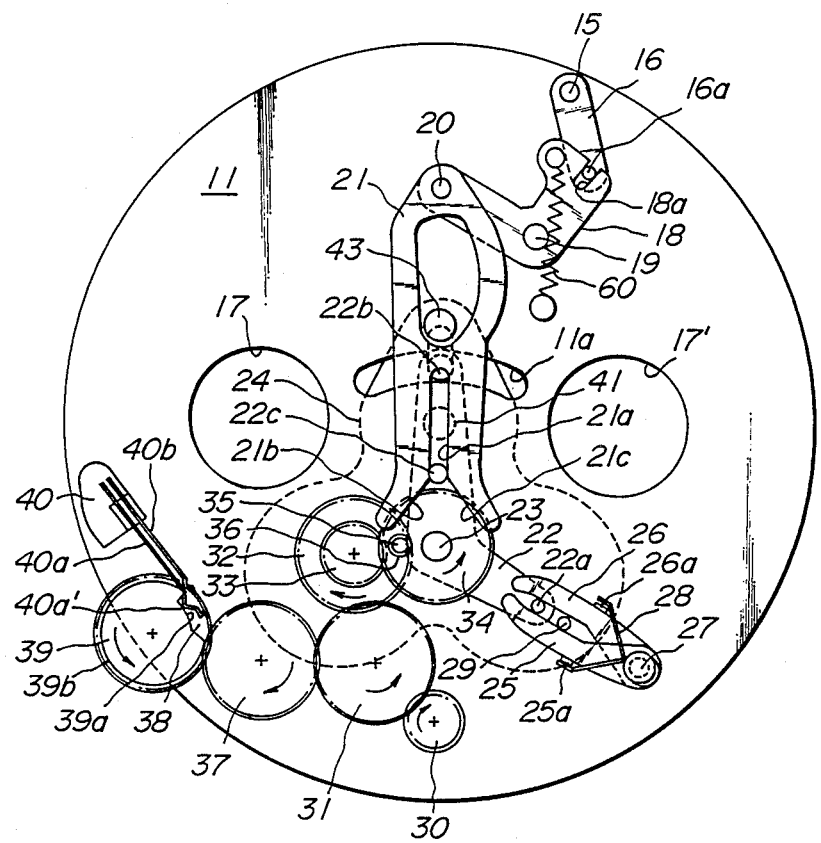
FIG_4

FIG_5
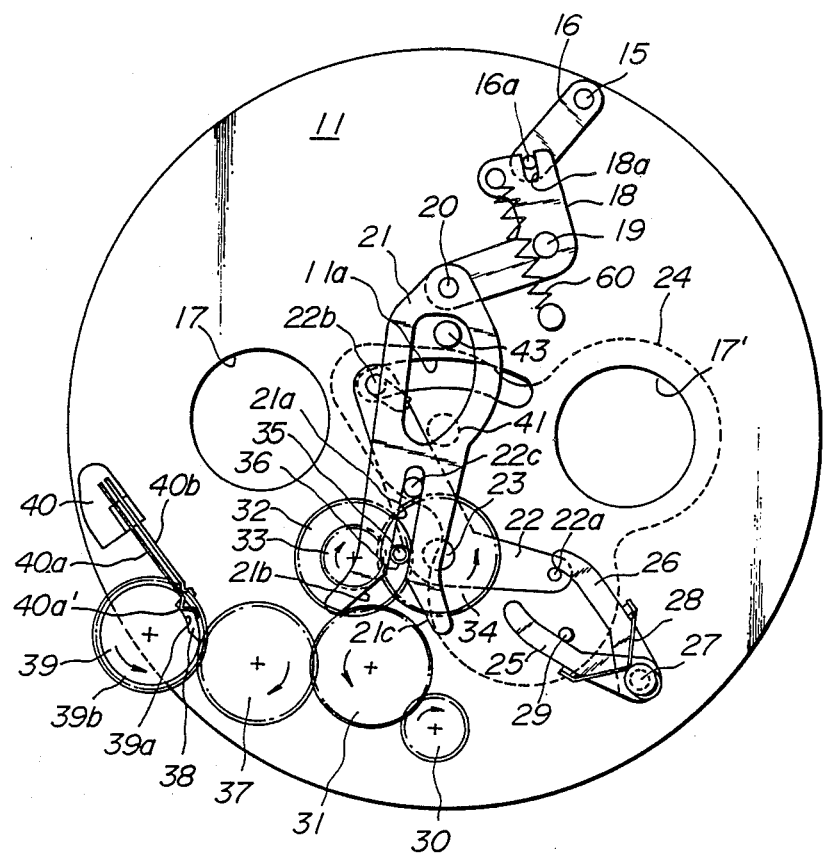

FIG_6
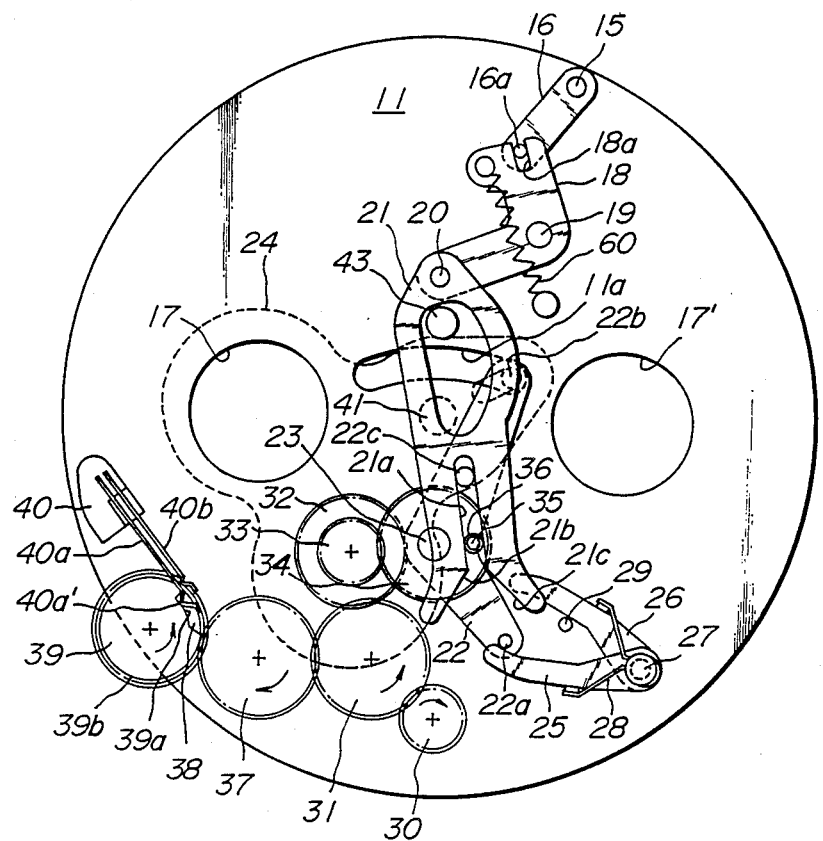

FIG_7a
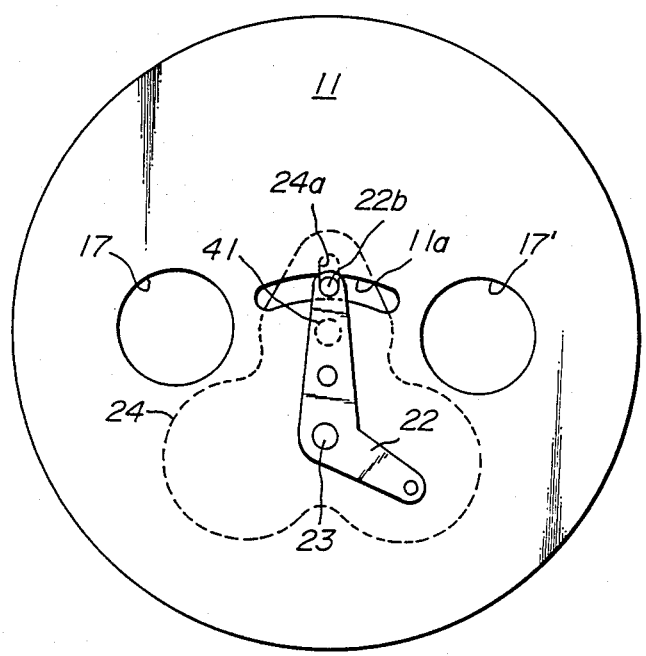

FIG_7b
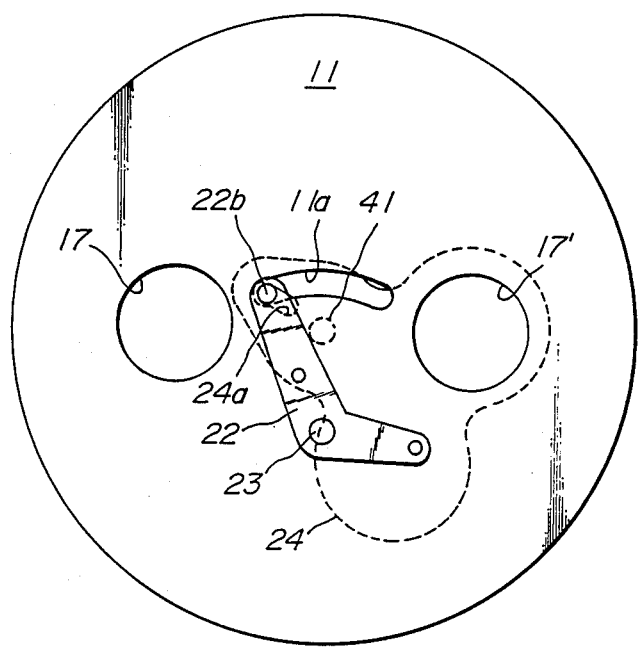

FIG_8
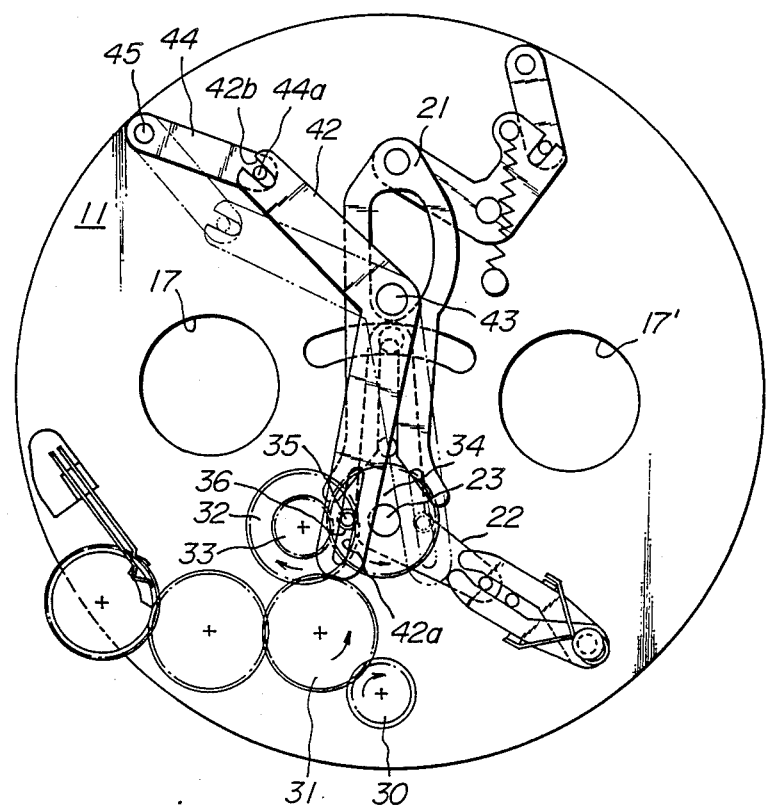

FIG_9
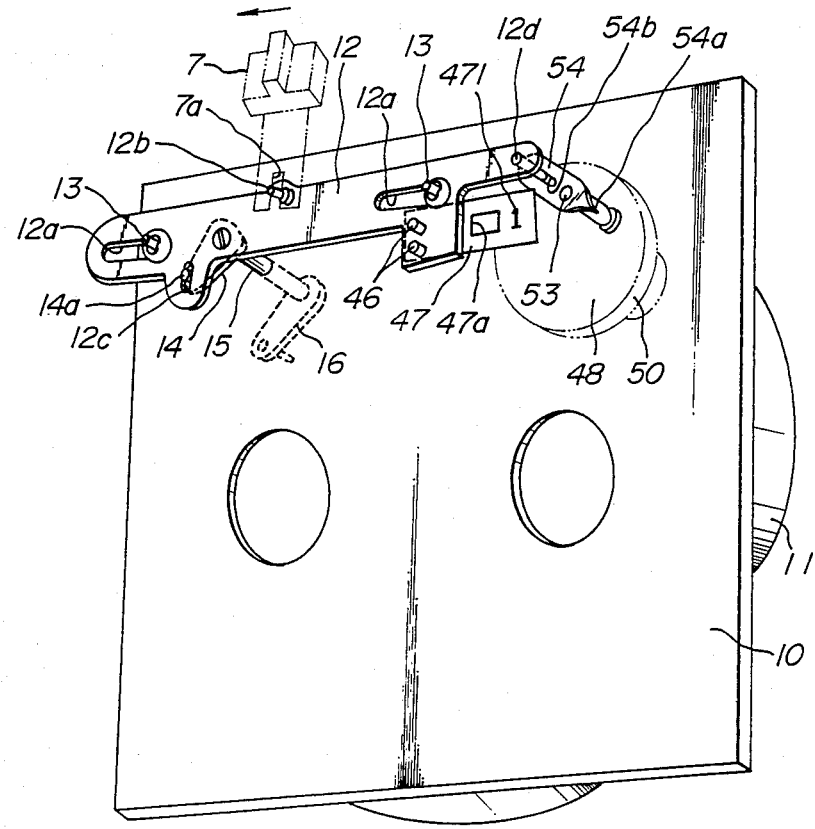

FIG_11
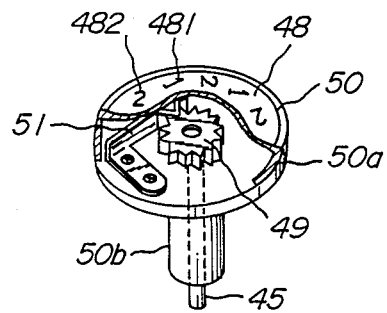
FIG_12
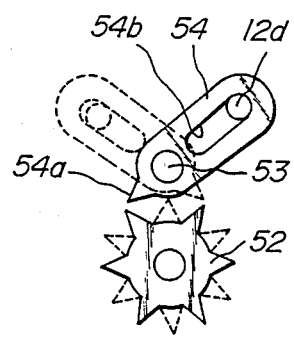

PHOTOGRAPHING NUMBER CHANGE-OVER DEVICE FOR TWO LENS CAMERA

BACKGROUND OF THE INVENTION

This invention relates to a photographing number change-over device for a two lens camera having two photographing lenses each provided with a shutter and capable of simultaneously photographing two pictures on a film.

There have been cameras capable of simultaneously photographing two portraits required for various kinds of licenses, certificates and the like as shown in FIG. 1.

Referring to FIG. 1, a camera body 1 comprises two chambers therein formed by equally dividing its inside by a partition wall. Each of the chambers is provided with a photographing lens 2 and a shutter (not shown). Upon actuating a release button 3, the two shutters are simultaneously opened and closed to photograph the same two pictures on an instant film 5 received in a film holder 4 as shown in FIG. 2.

With such a conventional two lens camera, two pictures are simultaneously obtained by one photographing operation. Therefore, even if it is desired to photograph two single pictures different in look or emotional expression by two photographing operations, two same pictures of two kinds are usually obtained on two films by two photographing operations, although it is clearly superfluous.

In this case, it is possible to avoid such a superfluity by covering one photographing lens by a lens cap which is removed from the lens after one photographing operation and set on the other lens for the other photographing operation. However, the operation of the lens cap is very troublesome, and there is a risk of double exposure if the lens cap is not exchanged so that it involves many problems in actual use.

A photographing number change-over device for a four lens camera has been proposed in Japanese Patent Application Laid-open No. 62-9,330 corresponding to U.S. patent application Ser. No. 81,099, U.S. Pat. No. 4,751,537. This disclosed change-over device provides an effective solution for problems in the four lens camera. However, this solution could not be applicable to the two lens camera concerning the present application owing to the inherent difference in construction between the two and four lens cameras. Therefore, an improved photographing number change-over device has been expected for many years.

SUMMARY OF THE INVENTION

It is a primary object of the invention to provide a photographing number change-over device for a two lens camera, which eliminates the disadvantages of the prior art as above described.

It is another object of the invention to provide a photographing number change-over device for a two lens camera, which is relatively simple in construction, inexpensive to manufacture, easy to operate, and rugged and durable in use.

In order to achieve these objects, in a photographing number change-over device for a two lens camera having two photographing lenses equipped with shutter, respectively, and capable of photographing two pictures at right and left or upper and lower portions on a film, the change-over device according to the invention comprises a driving member moving to two different positions alternately every time shutter charge is effected, a light cut-off plate rotatable about an axis substantially in parallel with optical axes of said photographing lenses, a regulating member engaging said light cut-off plate and detachably engaging the driving member for anchoring the light cut-off plate at either of first and second positions where the light cut-off plate shuts off either of said two photographing lenses depending upon positions of the driving member when the regulating member engages the driving member and anchoring the light cut-off plate at a third position where the light cut-off plate shuts off neither of the two photographing lenses when the regulating member does not engage the driving member, and a change-over member for causing said regulating member and said driving member to engage and disengage from each other.

The photographing number change-over device preferably further comprises a counter dial for advancing and retracting marks one by one to be displayed in a counter window respectively interlocking with the change-over member and the driving member, and a counter window opening member for concealing and revealing the marks to be displayed in the counter window interlocking with operations of the change-over member.

With the device constructed as above described, when the regulating member engages the driving member, the light cut-off plate assumes the first position where the light cut-off plate shuts off either of the photographing lenses depending upon two different positions into which the driving member alternately moves every time the shutter is charged. Therefore, only one picture is photographed on a two-divided film through the other photographing lens which is not shut off Such a photographing is referred to hereinafter "one picture photographing".

On termination of the first photographing, the shutter charge is effected so that the driving member is moved to the other position which is the second position where the photographing lens used in the first photographing is shut off. Therefore, a further picture is photographed on the remaining part of the film through the other photographing lens.

On the other hand, when the regulating member disengages from the driving member, the light cut-off plate is anchored at a third position where neither of the photographing lenses is shut off by the light cut-off plate irrespective of the movement of the driving member. Therefore, upon actuating the shutter, two pictures are simultaneously photographed on a two-divided film. Such a photographing is referred to hereinafter as "two picture photographing".

With the device equipped with the counter dial and the counter window according to the invention, the number of photographing times is displayed in the counter window every photographing in case of one picture photographing. On the other hand, in case of two picture photographing the mark is concealed to display in the counter window the fact that photographing will be completed by one photographing operation.

In order that the invention may be more clearly understood, preferred embodiments will be described, by way of example, with reference to the accompanying drawings.

BRIEF DESCRIPTION OF THE DRAWINGS

FIG. 1 is a perspective view of one example of the two lens camera of the prior art;

FIG. 2 is a plan view showing a film photographed by the two lens camera shown in FIG. 1;

FIG. 3 is a perspective view illustrating the external appearance of a two lens camera equipped with the device according to the invention;

FIG. 4 is a back elevation view showing a principal part of one embodiment of the invention in the two picture photographing mode;

FIGS. 5 and 6 are back elevation views of the principal part in the one picture photographing mode, respectively;

FIGS. 7a, 7b and 7c are back elevation view illustrating different conditions of the light shut-off plate, respectively;

FIG. 8 is a back elevation view showing a connection from the driving member to the counter;

FIGS. 9 and 10 are front perspective views illustrating the base plate in two and one picture photographing modes, respectively; and FIGS. 11 and 12 are a perspective view of the counter mechanism and a plan view of important parts thereof.

DESCRIPTION OF PREFERRED EMBODIMENTS

Figure 7C:
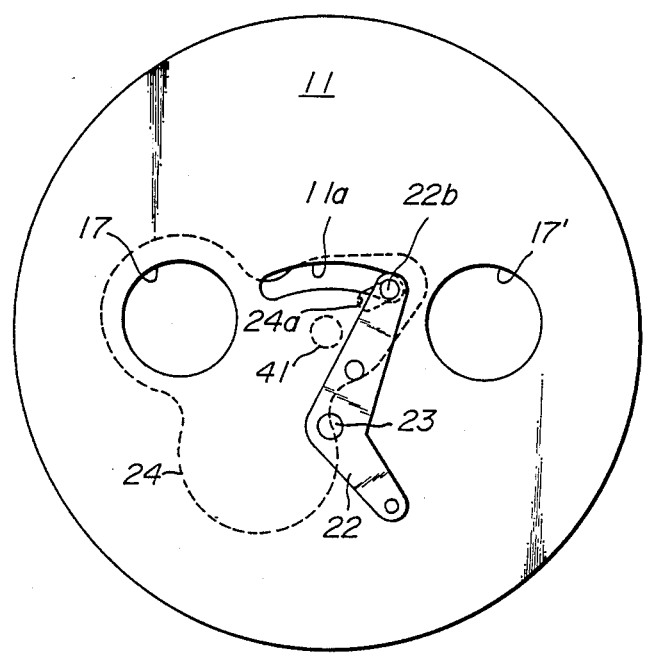

Preferred embodiments of the invention will be explained by referring to FIGS. 3–10.

FIG. 3 illustrates the outline of a two lens camera having a photographing number change-over device according to the invention, wherein like parts are designated by the same reference numerals as those in FIG. 1.

Under a camera body is provided an electric charge device 6 having a motor therein. When a release button 3 is pressed, a magnetic release device built in the camera body 1 is actuated to open and close a shutter and thereafter the shutter is charged by the electric charge device 6 to bring the camera into a condition ready for photographing.

In FIG. 3, reference numeral 7 denotes a change-over knob which is a change-over member for changing photographing number between one and two picture photographings. FIG. 3 illustrates the camera in the two picture photographing mode. The camera has a counter window for indicating photographing numbers and a front cover 9.

FIGS. 4–8 are plan views of a shutter case provided on a back of base plate 10 viewed from a back side thereof.

Figure 10:
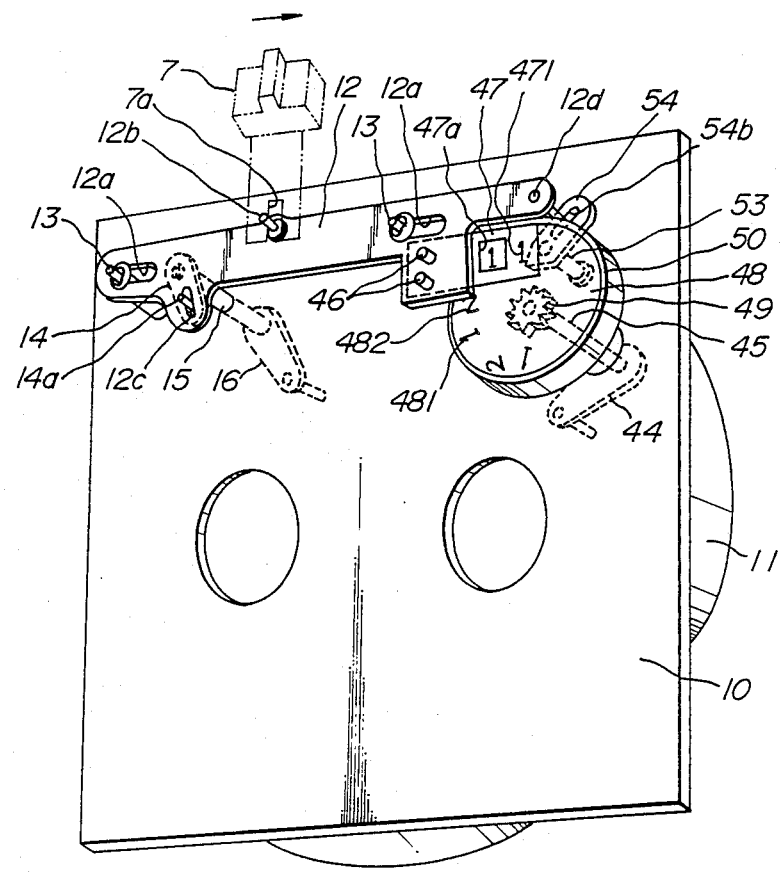

FIGS. 9 and 10 are perspective views of the base plate 10 after removal of a photographing lens 2 and the front cover 9 from the camera, illustrating the base plate in the two and one photographing, modes, respectively.

As shown in FIG. 9, a change-over slide plate 12 is provided slidably relative to the base plate with the aid of two elongated apertures 12a formed in the plate 12 and guide pins 13 fixed on the base plate 10 by driving action of the change-over knob 7 whose forked member 7a engages a pin 12b fixed to the plate 12. The plate 12 is formed with a further elongated aperture 12c. A lever 14 is provided with a pin 14a which engages in the elongated aperture 12c. The lever 14 is integrally connected with a lever 16 shown in phantom lines in FIG. 9 through a shaft 15 extending through the base plate 10 and the shutter case 11.

When the change-over knob 7 is set (in a direction shown by an arrow in FIG. 9) onto the two picture photographing mode, the change-over slide plate 12 is slid to the left with the aid of the fork 7a and the pin 12b so that the levers 14 and 16 are rotated in the clockwise direction viewed in FIG. 9 about the shaft 15 through the elongated aperture 12c and the pin 14a.

FIG. 4 illustrates the two picture photographing mode corresponding to FIG. 9.

In FIG. 4, the shutter case 11 is formed with two openings 17 and 17' at positions corresponding to two optical axes of the shutter case. Between the shutter case and the base plate 10 there is provided a shutter and iris unit (not shown).

A bell crank 18 is pivotally connected to the shutter case 11 by a pin 19, and has one end engaging the lever 16 through a forked portion 18a and a pin 16a. A pendulum plate 21 is pivotally connected to the other end of the bell crank 18 by a pin 20. The bell crank 18 is urged to be rotated about the pin 19 by a spring 60 whose ends are connected to the bell crank 18 and the shutter case 11, and is click-stopped at stopped positions at both extreme ends of the rotation.

The pendulum plate 21 is divided into two arms to form a fork 21a and oblique surfaces 21b and 21c extending away from each other.

A bell crank 22 consisting of two arms is pivotally connected to the shutter 11 by a shaft 23 and has a pin 22a fixed to one end of the one arm, a pin 22b fixed to one end of the other arm, and a pin 22c fixed to the one arm at a location which is substantially at a mid position on a line connecting the pin 22b and the shaft 23. The pin 22c engages the pendulum plate 21 through the fork 21a. The pin 22b extends through an arcuate aperture 11a formed in the shutter case 11 and engages an elongated aperture 24a (FIG. 7) of a light cut-off plate 24 shown in broken lines enclosed in the shutter case 11. The pin 22b forms with the pendulum plate 21 and the bell crank 22 a regulating member for the light cut-off plate 24.

Two levers 25 and 16 having shapes in symmetry with each other are pivotally connected to the shutter case 11 by means of a common shaft 27. A wire spring 28 is supported by the shaft 27 about which the spring 28 is coiled. Ends of the spring 28 engage bent portions 25a and 26a of the levers 25 and 26 to urge the levers toward each other so that the levers embrace therebetween a pin 29 fixed to the shutter case 11 and the pin 22a of the bell crank 22.

A driving gear 30 is driven through a reduction gear assembly by a motor (not shown) built in the electric charge device 6 shown in FIG. 3. The driving gear 30 causes to rotate through intermediate gears 31, 32 and 33 a change-over gear 34 pivoted about the shaft 23 common to the bell crank 22 in a direction shown by an arrow. The change-over gear 34 is provided with a shaft 35 rotatably supporting a roller 36 which is driving member for the pendulum plate 21.

Likewise, the driving gear 30 causes a cam gear 38 to rotate through the intermediate gears 31 and 37 in a direction shown by an arrow. A cam 39 in the form of a disk having a notch 39a is fixed to the cam gear 38. A gear ratio between the change-over gear 34 and the cam gear 38 is set so that during one rotation of the cam gear 38, the change-over gear 34 is rotated one half of a rotation.

Moreover, to the shutter case 11 is fixed a switch 40 having a pair of electrodes 40a and 40b, the electrode 40a being urged against the cam 39 by a resilience of the electrode itself. The switch 40 serves to turn on and off a circuit for the above motor. While a distal end 40a' of the electrode 40a is in contact with a circumference 39b of the cam 39, the electrodes 40a and 40b are closed together. On the other hand, when the distal end 40a' is in contact with the notch 39a, the electrodes 40a and 40b are opened or spaced apart from each other.

When the release button 3 shown in FIG. 3 is pressed and the shutter is released, the motor (not shown) built in the electric charge device 6 is energized to start charging the shutter, and at the same time the driving gear 30 is rotated so that the change-over gear 34 and the cam gear 38 are rotated through the intermediate gears 31, 32, 33 and 37 in the directions shown by the arrows, respectively.

At the commencement of the rotation of the cam gear 38, the distal end 40a' of the electrode 40a moves from the notch 39a of the cam 39 to its circumference 39b to close the electrodes 40a and 40b so that the motor continues its rotation. When the cam gear 38 has been rotated one rotation, the distal end 40a' of the electrode 40a again enters the notch 39a of the cam 39 so that the electrodes 40a and 40b are opened to stop the motor. During one rotation of the cam gear 38, the shutter charge is completed and the roller 36 has been moved to a diametrically opposed position with respect to the center shaft 23 owing to the one half of the one rotation of the change-over gear 34.

Under the two picture photographing mode, the lever 16 is set into a counterclockwise direction viewed in FIG. 4. Therefore, the bell crank 18 is rotated about the pin 19 in a clockwise direction and retained at the position by the urging force of the spring 60.

The pendulum plate 21 is raised by the pin 20 on the bell crank 18 to disengage from the engagement with the roller 36. Therefore, the pendulum plate 21 is under a pivotal position about the pin 20 and engages the bell crank 22 through the fork 21a and the pin 22c. The pin 22a of the bell crank 22 together with the fixed pin 29 is embraced by the levers 25 and 26 by the action of the spring 28 so that the bell crank 22 is held in the position shown in FIG. 4 because it is not subjected to any force from other members.

Accordingly, the other pins 22b and 22c of the bell crank 22 are positioned substantially on a line perpendicularly dividing into two equal line sections a line which connects centers of the openings 17 and 17', and the pendulum plate 21 is also held in the position shown in FIG. 4.

FIGS. 7a–7c are for explaining the relation between the bell crank 22 and the light cut-off plate 24.

In FIG. 7a, the pin 22b of the bell crank 22 engages through the arcuate aperture 11a of the shutter case 11 the elongated aperture 24a of the light cut-off plate 24 rotatably supported by the shaft 41 in the shutter case 11. When the pin 22b is positioned substantially on the above perpendicularly dividing line, the light cut-off plate 24 is in the position where it does not shut off either of the openings 17 and 17' as shown in FIG. 7a so that two images are simultaneously photographed.

When the change-over knob 7 is set into the one picture photographing mode (in a direction shown by an arrow) as shown in FIG. 10, the change-over slide plate 12 is slid to the right with the aid of the fork 7a and the pin 12b so that the levers 14 and 16 are rotated about the shaft in the counterclockwise direction through the elongated aperture 12c and the pin 14a.

FIGS. 5 and 6 illustrate the one picture photographing mode corresponding to FIG. 10.

Referring to FIG. 5, when the lever 16 is rotated in the clockwise direction, the bell crank 18 is rotated in the counterclockwise direction by the pin 16a and the fork 18a against the force of the spring 60 and is held in the position shown in the drawing by the click action of the spring 60.

The pendulum plate 21 is lowered downward and guided along the pin 22c engaging the fork 21a by the downward movement of the pin 20 so that either one of the oblique surfaces 21b and 21c at the end of the pendulum plate 21 is brought into contact with the roller 36. In FIG. 5, as the roller 36 is positioned on the left side of the shaft 23, the oblique surface 21b is in contact with the roller 36. When the pendulum plate 21 is further lowered, it swings to the left guided by the rotatingly contacting roller 36 in contact with the oblique surface 21b against the force of the pin 22c returning to the center. The pendulum plate 21 is then held in this position with the fork 21a embracing the roller 36.

As a result, the bell crank 22 is rotated in the counterclockwise direction by the movement of the fork 21a and the pin 22c and is held in this position, so that the pin 22a causes the lever 26 to raise against the force of the spring 28 and the pin 22b is moved to the left.

When the pin 22b is moved to the left, the light cut-off plate 24 is rotated in the counterclockwise direction viewed in FIG. 7b to shut off the opening 17'.

When the release button 3 is then pressed to release the shutter, the photographing is effected only through the opening 17. Namely, the frame 5a on the left side of the film 5 shown in FIG. 2 is exposed by means of the photographing lens on the right side shown in FIG. 3.

Simultaneously, the motor is energized to start the shutter charge so that the change-over gear 34 and the roller 36 are rotated and revolved in the counterclockwise direction, respectively. As a result, the pendulum plate 21 is swung about the pin 20 to the right. Upon termination of the shutter charge, the cam gear 38 has been rotated one rotation and the motor has been stopped. At the same time, the change-over gear 34 has been rotated through 180° and the roller 36 is stationary on the right side of the shaft 23 as shown in FIG. 6.

Therefore, the pendulum plate 21 is swung to the right and is held by the roller 36 embraced by the fork 21a. Even if the roller 36 comes out of the fork 21a during the revolution of the roller 36, any trouble is not caused in operation because of the oblique surface 21c in contact with the roller 36. As a result of the swinging of the pendulum plate 21, the bell crank 22 is rotated in the clockwise direction and held thereat, so that pin 22a urges the lever 25 downward against the bias of the spring 28 and the pin 22b moves to the right.

When the pin 22b moves to the right, the light cut-off plate 24 is rotated in the clockwise direction to shut off the opening 17 as shown in FIG. 7c. Therefore, frame 5b on the right side of the film 5 is exposed through the opening 17' by means of the photographing lens on the left side.

It has been explained that when the roller 36 is on the left side as shown in FIG. 4, the mode is changed into the one picture photographing mode. In the event that the mode is changed when the roller 36 is on the right side as shown in FIG. 6, the same operation is effected with the exception that the frame 5b on the right side is exposed in the first time and the frame 5a on the left side is exposed in the second time. Moreover, even if the first photographing is started on a new film under a condition which is already the one picture photographing mode, trouble does not occur in operation.

The operation of the counter for indicating photographing numbers of times in the one and two photographing modes will be explained hereinafter.

In FIG. 8, a bell crank 42 is pivotally connected at shaft 43 to the shutter case 11 and is formed in one end of its one arm with a fork 42b and in one end of the other arm with an elongated aperture 42a engaging the shaft 35 of the roller 36. A lever 44 is fixed to a shaft 45 rotatably passing through the base plate 10 and shutter case 11. The lever 44 is provided at the other end with a pin 44a which engages the fork 42b of the bell crank 42.

When the shutter charge is effected, the change-over gear 34 is rotated through 180° and the shaft 35 is moved from the left side of the center shaft 23 to the right side. In connection therewith, the bell crank 42 and the lever 44 are rotated in the counterclockwise and clockwise directions, respectively, from positions in solid lines to positions in two-dots-and-dash lines. In the event that the shaft 35 is moved from the right to the left, the above members are moved in the reverse directions, respectively.

Therefore, every time the shutter is released, the shaft 45 is alternately rotated in the clockwise and counterclockwise directions.

Referring to FIG. 9, fixed to the change-over slide plate 12 is a window-formed indicator plate 47 which is provided with a mark of "1" denoted by numeral 471 and a window 47a on the left side thereof adjacent each other. With the two picture photographing mode, the window-formed indicator plate 47 has been moved to the left together with the change-over slide plate 12 so that "1" of mark 471 is indicated through the counter window 8 shown in FIG. 3.

Namely, in case of the two picture photographing mode, the counter for indicating the photographing number is "1" because two images are simultaneously photographed on one film by one exposure.

In case of one picture photographing mode, the window-formed indicator plate 47 has been moved to the right together with the change-over slide plate 12 as shown in FIG. 10 so that the counter window 8 and the window 47a are aligned with each other, with the result that either of "1" and "2" of marks 481 and 482 is indicated through the window 47a and the counter window 8. The "1" and "2" of the marks 481 and 482 are of the same number and are alternately arranged angularly equally spaced in a circle on a counter dial 48.

Thus the window-formed indicator plate 47 serves as a counter window opening member for revealing and concealing the marks on the counter dial 48 for displaying in the counter window 8.

FIG. 11 is a perspective view after partial removal for explaining a mechanism in connection with the counter dial. FIG. 12 is a partial view for explaining the relation between a sprocket gear 52 and a pawl lever 54.

A ratchet gear 49 is fixed to one end of the shaft 45 passing through the base plate 10 and the shutter case 11 remote from the lever 44. The number of the teeth of the ratchet gear 49 is twice the number n of pairs of the marks 481 and 482, that is, (2n). For example, if the number n of pairs of the marks is 6, the number of the teeth is 12.

A dial case 50 is rotatably provided about the shaft 45 and embraced between the ratchet gear 49 and the base plate 10 (not shown). A ratchet spring 51 is fixed to the dial case 50 and has one end which engages the teeth of the ratchet gear 49. Therefore, the dial case 50 is rotated together with the ratchet gear 49. However, if an external force in excess of the holding force of the ratchet spring 51 acts on the dial case 50, the relative position between the dial case and the ratchet gear is angularly shifted at one tooth at a time.

The counter dial 48 is fixed onto an upper surface of a mechanism section 50a of the dial case 50 housing therein the ratchet gear 49 and the ratchet spring 51 such that a center of the marks 481 and 482 is aligned with the shaft 45.

The sprocket gear 52 having teeth (for example, six teeth) is fixed concentrically to and on an underside of the mechanism section 50a of the dial case 50 or an upper end of the sleeve portion 50b. A pawl 54a of the pawl lever 54 pivotally connected to the base plate 10 by the shaft 53 is in opposition to the sprocket gear 52 at the same level. The pawl lever 54 is formed with an elongated aperture 54b on the opposite side of the pawl 54a with respect to the shaft 53. A pin 12d of the change-over slide plate 12 engages in the elongated aperture 54b.

The sprocket gear 52 is set to assume positions shown in solid and broken lines respectively when either one of the marks 481 indicating "1" on the counter dial 48 is in alignment with the counter window 8 (referred to hereinafter as "first position") and when either one of the marks 482 indicating "2" is in alignment with the counter window 8 (referred to hereinafter as "second position").

In the one or two picture photographing mode, the change-over slide plate 12 (not shown) is set in the right or left end position and the pin 12d and the pawl lever 54 assume the positions shown in solid and phantom lines. The pawl 54a is not related to the rotation of the sprocket gear 52.

Upon changing over from the one picture photographing to the two picture photographing mode or vice versa, the pawl lever 54 is rotated in the counterclockwise or clockwise direction. In this case, if the sprocket gear 52 is in the first position, the pawl 54a of the pawl lever 54 is not related to the sprocket gear 52. However, if the sprocket gear 52 is in the second position, one tooth of the sprocket gear 52 is urged by the pawl 54a of the pawl lever 54 so as to be rotated together with the dial case 50 in the clockwise or counterclockwise direction by an angle corresponding to one tooth of the ratchet gear 49 against the action of the ratchet spring 51 so that the sprocket gear 52 assumes the first position.

Namely, every time the photographing modes are changed, the counter dial 48 assumes the first position. Therefore, when the mode is one picture photographing mode and the window 47a of the window-formed indicator plate 47 is aligned with the counter window 8, the "1" of the mark 481 appears in the counter window 8.

When the first photographing has been effected, the counter dial 48 is rotated in the clockwise or counterclockwise direction through the bell crank 42, the lever 44, the shaft 45, the ratchet gear 49, the ratchet spring 51 and the dial case 50 so that "2" of the mark 482 on the right or left side appears in the counter window 8.

When a second photographing has been effected, the above elements of the mechanism are all rotated in reverse directions and the "1" previously indicated appears again in the counter window 8 which indicates the fact that the camera has been ready for the photographing for a new film.

As the marks 481 and 482 of the counter dial 48 are alternately arranged, the order of indication of "1", "2" and "1" is not changed, irrespective of the rotated direction of the counter dial 48.

As the "1" of the mark 471 of the window-formed indicator plate 47 is always indicated in the counter window 8 in the two picture photographing mode, the marks 481 and 482 of the counter dial 48 are not shown in the counter window 8, even if the counter dial 48 is rotated.

It is assumed that after a first photographing has been effected in the two picture photographing mode, the film is removed from the camera and a new film is set in substituting for the old film for any reason (for example, it is required to develop the old film promptly to see its result). In this case, the mark "2" remains in the counter window 8. It is no trouble to continue photographing under this condition. However, the mark "1" will appear in the counter window 8 by changing once the mode into two picture photographing mode and thereafter returning again the mode to the one picture photographing mode. Therefore, mishandling such as unexposure and multiple exposure is prevented.

Although the invention has been explained applied to the two lens camera whose shutter charge is effected by the electric motor in this embodiment, it is applicable to a two lens camera whose shutter charge is manually effected. In this case, th invention can be carried out in the same manner as by providing members corresponding to the shaft 35 or the roller 36 which moves to two different positions alternately interlocking with the shutter charge.

In this case, the changing to the two picture photographing mode can be effected at any time. However, it is preferable to change the mode to the one picture photographing mode after the shutter charge, If the shutter charge is carried out erroneously after changing to the one picture photographing mode, "2" will appear in the counter window. Such a mistake will take place in the case that the shutter charge is hurriedly effected after finding inoperation of the shutter due to changing to the one picture photograping mode without charging the shutter. In such a case, the counter indication is able to be changed to "1" by again changing the mode in the similar manner as in the case of the removal of the film after the first photographing.

As can be seen from the above explanation, with the photographing number changing-over device according to the first aspect of the invention, the driving members are alternately moved to two different positions interlocking with the shutter charge and the regulating member engaging the light cut-off plate is engaged with or disengaged from the driving members by the change-over member so that upon engaging the light cut-off plate is changed into first and second positions where the light cut-off plate shut off only either of the photographing lenses, and upon disengaging the light cut-off plate is changed into a third position where the light cut-off plate shuts off neither of the photographing lenses. Therefore, even if the photographing number is changed under any conditions, photographings of a required number can be always carried out, so that the easiness in operation is remarkably improved in comparison with the prior art method using a lens cap, and moreover mistakes in photographing such as multiple exposure and shutter operation with mishandling are prevented.

Moreover, according to the second aspect to the invention in addition to the components of the first aspect there is provided the counter dial for advancing or retracting the marks one by one to be displayed in the counter window in interlocked with the change-over member and the driving member, and the counter window opening member for revealing and concealing the mark indicated in the counter window interlocked with the operation of the change-over member. Therefore, the counter is automatically changed over by operation the change-over member so that there is no longer any risk of mistakenly operating the camera.

It is further understood by those skilled in the art that the foregoing description is that of preferred embodiments of the disclosed devices and that various changes and modifications may be made in the invention without departing from the spirit and scope thereof.

What is claimed is:

1. A photographing number change-over device for a two lens camera having two photographing lenses equipped with shutters, respectively, and capable of photographing two pictures on a film, said device comprising a driving member moving to two different positions alternately every time shutter charge is effected, a light cut-off plate rotatable about an axis substantially in parallel with optical axes of said photographing lenses, a regulating member engaging said light cut-off plate and detachably engaging the driving member for anchoring the light cut-off plate at either of first and second positions where the light cut-off plate shuts off either of said two photographing lenses depending upon positions of the driving member when the regulating member engages the driving member and anchoring the light cut-off plate at a third position where the light cut-off plate shuts off neither of the two photographing lenses when the regulating member does not engage the driving member, and a change-over member for causing said regulating member and said driving member to engage and disengage from each other.

2. A photographing number change-over device as set forth in claim 1, wherein said driving member is constituted by a roller supported by a shaft which is fixed on a rotating member near to its outer circumference, and said rotating member is rotated through one half rotation during the shutter charge, thereby enabling the roller to assume either of said first and second positions.

3. A photographing number change-over device as set forth in claim 2, wherein said rotating member is driven by a gear train which is branched from a gear train for the shutter charge driven by a motor built in an electric charge device provided in the camera.

4. A photographing number change-over device as set forth in claim 1, wherein said regulating member comprises a pendulum plate rockable and driven by movement of the change-over member and a bell crank rotatably fixed at its mid portion to a stationary member and having at one end a pin engageable and driven by said pendulum plate and at the other end a pin engaging said light cut-off plate.

5. A photographing number change-over device as set forth in claim 4, wherein said pendulum plate is driven by the movement of the change-over member through a lever rockably driven by said change-over member and a bell crank pivotally connected to the stationary member and having both ends pivotally connected to said lever and said pendulum plate, respectively, and further having a spring for click-stopping the bell crank at extreme ends of its pivotal movement.

6. A photographing number change-over device as set forth in claim 5, wherein there is provided a change-over slide plate driven by said change-over member in longitudinal directions of the change-over slide plate to rockably drive said lever pivotally connected through the bell crank to the pendulum plate.

7. A photographing number change-over device as set forth in claim 1, wherein said device further comprises counter means for displaying the number of photographing times, said counter means comprises a counter dial means for advancing and retracting marks one by one to be displayed in a counter window and respectively interlocking with the change-over member and the driving member, and a counter window opening member for concealing and revealing the marks to be displayed in the counter window interlocking with operations of said change-over member.

8. A photographing number change-over device as set forth in claim 7, wherein said dial means comprises a counter dial having marks indicating photographing possible number of times alternately arranged in a circle and rotated in either of clockwise and counterclockwise directions through an angle corresponding to one of said marks by the movements of the driving member to said different positions, a pawl lever having a pawl and rockable to two extremely rocked positions in response to movements of the change-over member to one and two picture photographing modes, and a sprocket gear driven by said pawl of the pawl lever when said one of the mark appears in the counter window to drive the counter dial in either of the clockwise and counterclockwise directions.

9. A photographing number change-over device as set forth in claim 8, said counter dial is driven by the movements of said driving member through a bell crank pivotally connected to a stationary member and having an arm engaging said driving member, and a lever having one end pivotally connected to the other arm of said bell crank and the other end supporting said counter dial.

10. A photographing number change-over device as set forth in claim 7, wherein said counter window opening member is constituted by a window-formed indicator plate which is movable together with the change-over member and having a window and a mark indicating one of photographing possible number of times.

* * * * *

UNITED STATES PATENT AND TRADEMARK OFFICE
CERTIFICATE OF CORRECTION

PATENT NO. : 4,851,867

DATED : July 25, 1989

INVENTOR(S) : Hiroshi Taniguchi

It is certified that error appears in the above-identified patent and that said Letters Patent is hereby corrected as shown below:

Column 2, line 34, after "off" insert a period (.).

Column 3, line 16, change "view" to --views--.

Column 4, line 30, after "shutter" insert --case--.

Column 4, line 43, change "16" to --26--.

Column 4, line 59, after "is" insert --a--.

Column 5, line 53, after "are" insert --views--.

Column 6, line 1, after "shaft" insert --15--.

Column 9, line 20, change "substituting" to --substitution--.

Column 9, line 34, change "th" to --the--.

Column 9, line 42, change the comma (,) to a period (.).

Column 9, line 48, change "photograping" to --photographing--.

Column 10, line 10, delete "in".

UNITED STATES PATENT AND TRADEMARK OFFICE
CERTIFICATE OF CORRECTION

PATENT NO. : 4,851,867

DATED : July 25, 1989

INVENTOR(S) : Hiroshi Taniguchi

It is certified that error appears in the above-identified patent and that said Letters Patent is hereby corrected as shown below:

Column 10, line 15, change "operation" to --operating--.

Signed and Sealed this

Second Day of October, 1990

Attest:

HARRY F. MANBECK, JR.

*Attesting Officer*     *Commissioner of Patents and Trademarks*